United States Patent
Wu

(10) Patent No.: US 7,296,898 B2
(45) Date of Patent: Nov. 20, 2007

(54) IMAGE PROJECTOR HAVING A LED LIGHT SOURCE

(75) Inventor: Chao Hsien Wu, Taipei (TW)

(73) Assignee: Premier Image Technology Corp. (TW)

( * ) Notice: Subject to any disclaimer, the term of this patent is extended or adjusted under 35 U.S.C. 154(b) by 88 days.

(21) Appl. No.: 11/187,481

(22) Filed: Jul. 22, 2005

(65) Prior Publication Data

US 2006/0077353 A1 Apr. 13, 2006

(30) Foreign Application Priority Data

Oct. 8, 2004 (TW) .............................. 93130524 A

(51) Int. Cl.
*G03B 21/16* (2006.01)
*G03B 21/18* (2006.01)
*G03B 21/26* (2006.01)

(52) U.S. Cl. .............................. 353/52; 353/57; 353/30

(58) Field of Classification Search .................. 353/52, 353/57, 59, 60, 61, 30; 349/161
See application file for complete search history.

(56) References Cited

U.S. PATENT DOCUMENTS 7,156,522 B2 * 1/2007 Plut ............................. 353/31

2002/0176054 A1 * 11/2002 Mihalakis ..................... 353/31
2005/0046808 A1 * 3/2005 Shiraishi et al. .............. 353/98
2006/0061733 A1 * 3/2006 Kuhlmann et al. ........... 353/30

* cited by examiner

*Primary Examiner*—Diane Lee
*Assistant Examiner*—Andrew Kong

(57) ABSTRACT

An image projector having a LED light source comprises: an optical engine using the LED as the light source, a PCB module, a heat sink module and a main frame. The printed circuit board (PCB) module further comprises: a first circuit board, a second circuit board, at least one I/O interface for connecting an external device, at least one card reader for connecting an external memory card, and a control unit for processing the image data received from the I/O interface or card reader and projecting the image by using the optical engine. The first circuit board and second circuit board are furnished in an overlap and parallel manner to decrease the space consumption. The heat sink module comprises a fan, an air inlet and an air outlet, which substantially forms a heat dissipating passage from the air inlet through the fan toward the air outlet. The LED and control unit are located in the heat dissipating passage for increasing better heat dissipation effect.

19 Claims, 8 Drawing Sheets

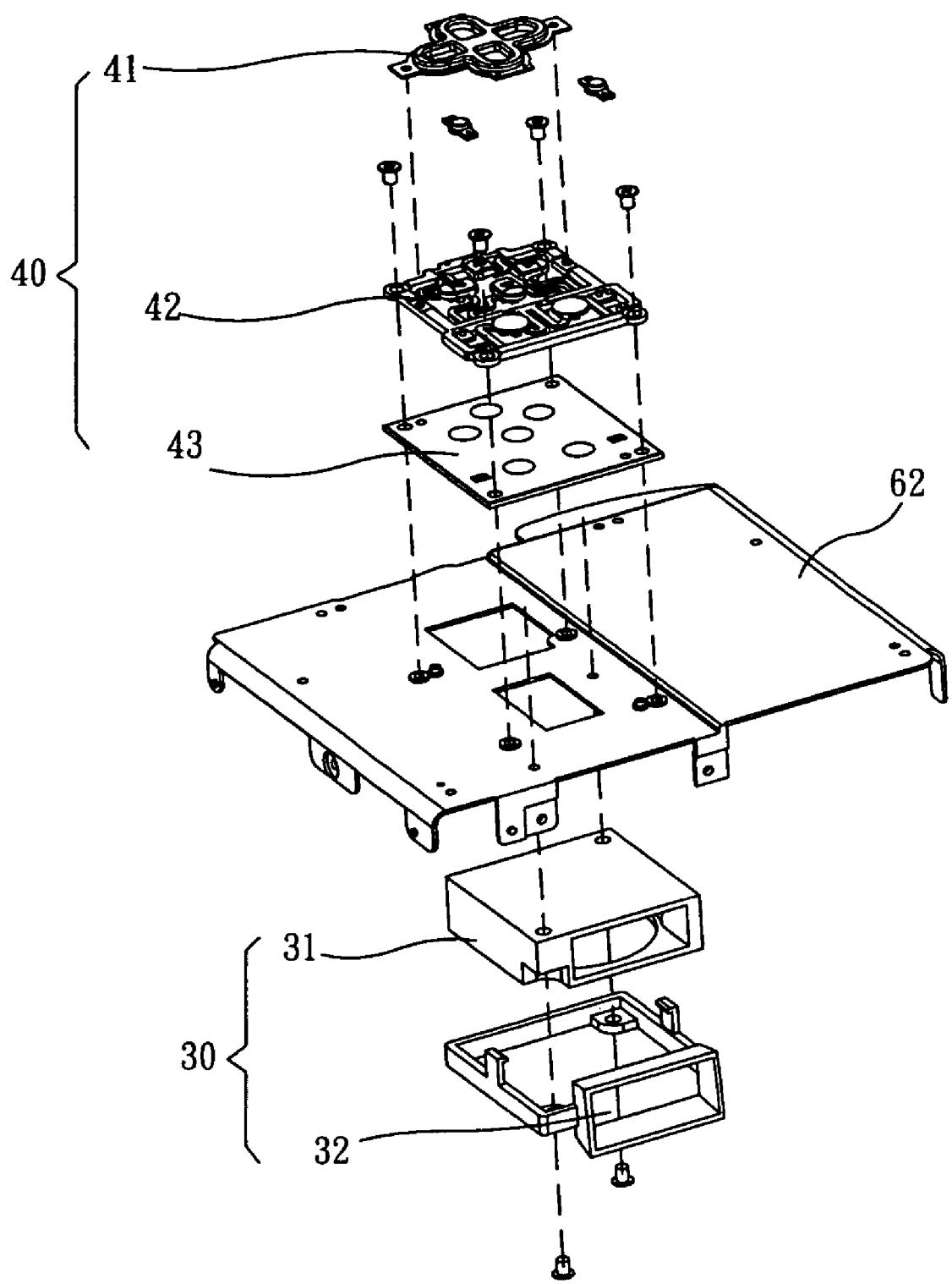
F I G. 5

IMAGE PROJECTOR HAVING A LED LIGHT SOURCE

BACKGROUND OF INVENTION

1. Field of the Invention

This invention is related to an image projector; in particular, is related to an image projector having a LED as the light source.

2. Description of the Prior Art

The conventional image projector has reached the threshold in effectively sizing down due to the limitation in the design of the optical engine, the PCB module and the heat-dissipating route. On one hand, the complexity of the optical elements and the design of the light path prevented smaller space usage in designing the image projector; on the other hand, the complexity and the numerous electronic elements used prevented the minimization of the printed circuit board (PCB). Moreover, the large quantity of heat generated by the illuminator of the optical engine and the microprocessor of the PCB module has to be effectively dissipated by using two or more units of bigger-size high power fan combined with a wide, smooth heat-dissipating route in the image projector produced. In conclusion, the space taken up by the heat dissipating route and the fan prevented the effective minimization of the size of the image projector produced by custom technology.

SUMMARY OF INVENTION

It is therefore one of the objectives of the claimed invention to provide an image projector that utilizes a light emitting diode (LED) as its illuminator. The image projector could dramatically decrease its size without affecting the efficiency and function thereof.

It is therefore one of the objectives of the claimed invention to provide an image projector that utilizes a light emitting diode (LED) as illuminator that includes two horizontally overlapping PCBs as its PCB module to reduce the space usage of itself. This design, as a result, enhances the reduction in size of this image projector.

It is therefore one of the objectives of the claimed invention to provide an image projector that utilizes a light emitting diode (LED) as its illuminator, with the special design for its heat dissipating module which separately places the heat generating light emitting diode and the PCB control unit, the former, near the vicinity of the entrance airway and the later, near the fan of the heat sink module, to enhance the effect of heat dissipation. Therefore, the image projection device in this invention can utilize a single and yet smaller heat dissipating fan which has smaller power, combined with a narrower heat dissipating route to effectively dissipate the heat generated by the device. This design further reduced the size of the image projector.

It is therefore one of the objectives of the claimed invention to provide an image projector that utilizes a light emitting diode as its illuminator so that the heat generation is effectively reduced, and favors the minimization of the size of the heat-dissipating module. Furthermore, the size of the image projector can be further diminished due to the special design of the optical elements and illumination pathway that reduces the dimensions of the optical engine.

It is therefore one of the objectives of the claimed invention to provide an image projector that utilizes a light emitting diode as illuminator, which contains a card reader that can be connected to a memory card. This device can directly retrieve the image data that is stored in the memory card and project it through the optical engine.

In accordance with these aspects of the present invention, an optical engine having a LED is provided, which comprises: an optical engine using the LED as the light source, a PCB module, a heat sink module and a main frame. The printed circuit board (PCB) module further comprises: a first circuit board, a second circuit board, at least one I/O interface for connecting an external device, at least one card reader for connecting an external memory card, and a control unit for processing the image data received from the I/O interface or card reader and projecting the image by using the optical engine. The first circuit board and second circuit board are furnished in an overlap and parallel manner to decrease the space consumption. The heat sink module comprises a fan, an air inlet and an air outlet, which substantially forms a heat dissipating passage from the air inlet through the fan toward the air outlet. The LED and control unit are located in the heat dissipating passage for increasing better heat dissipation effect.

BRIEF DESCRIPTION OF THE DRAWINGS

The details of the present invention will be more readily understood from a detailed description of the preferred embodiments taken in conjunction with the following Figures.

FIG. 5 illustrates the composite drawing of the heat dissipating module, operation interface module and the upper frame of the main frame of the image projector as shown in FIG. 1;

DETAILED DESCRIPTION

Figure 1:
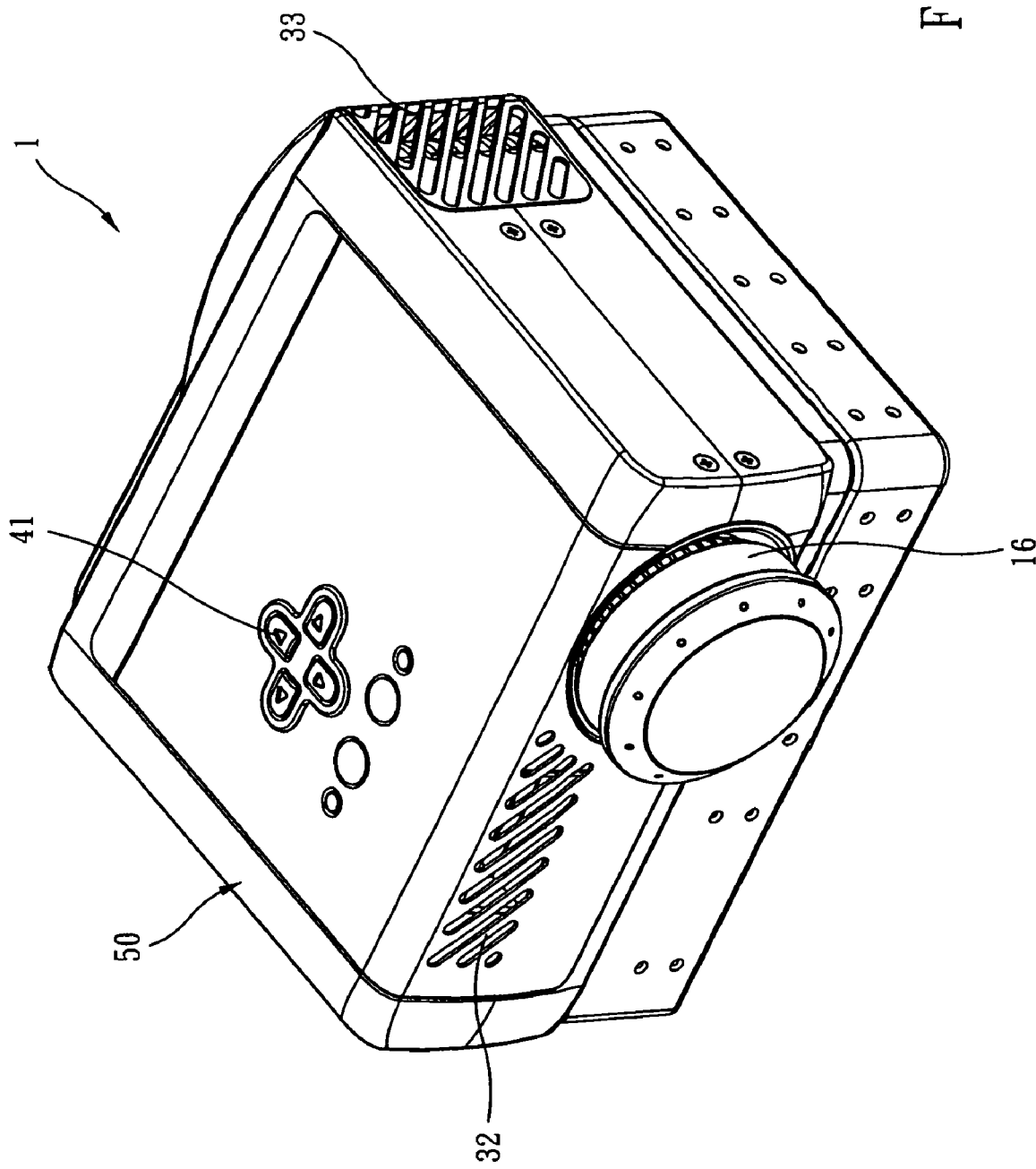
FIG. 1 illustrates the frontal stereoscopic view of the exterior appearance of the image projector that utilizes a light emitting diode as illuminator.
Figure 2:
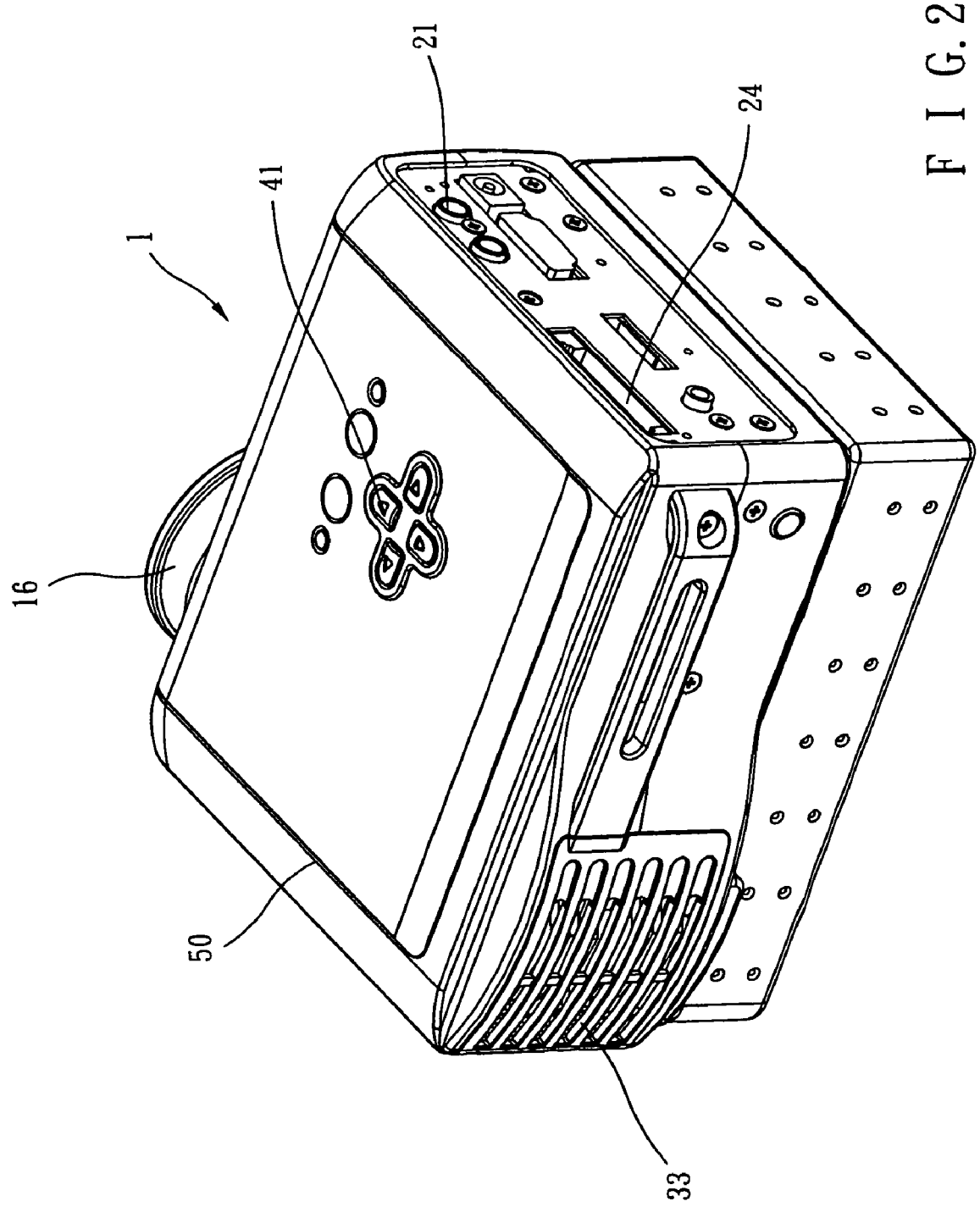
FIG. 2 illustrates the posterior stereoscopic view of the exterior appearance of the image projector as shown in FIG. 1.
Figure 3:
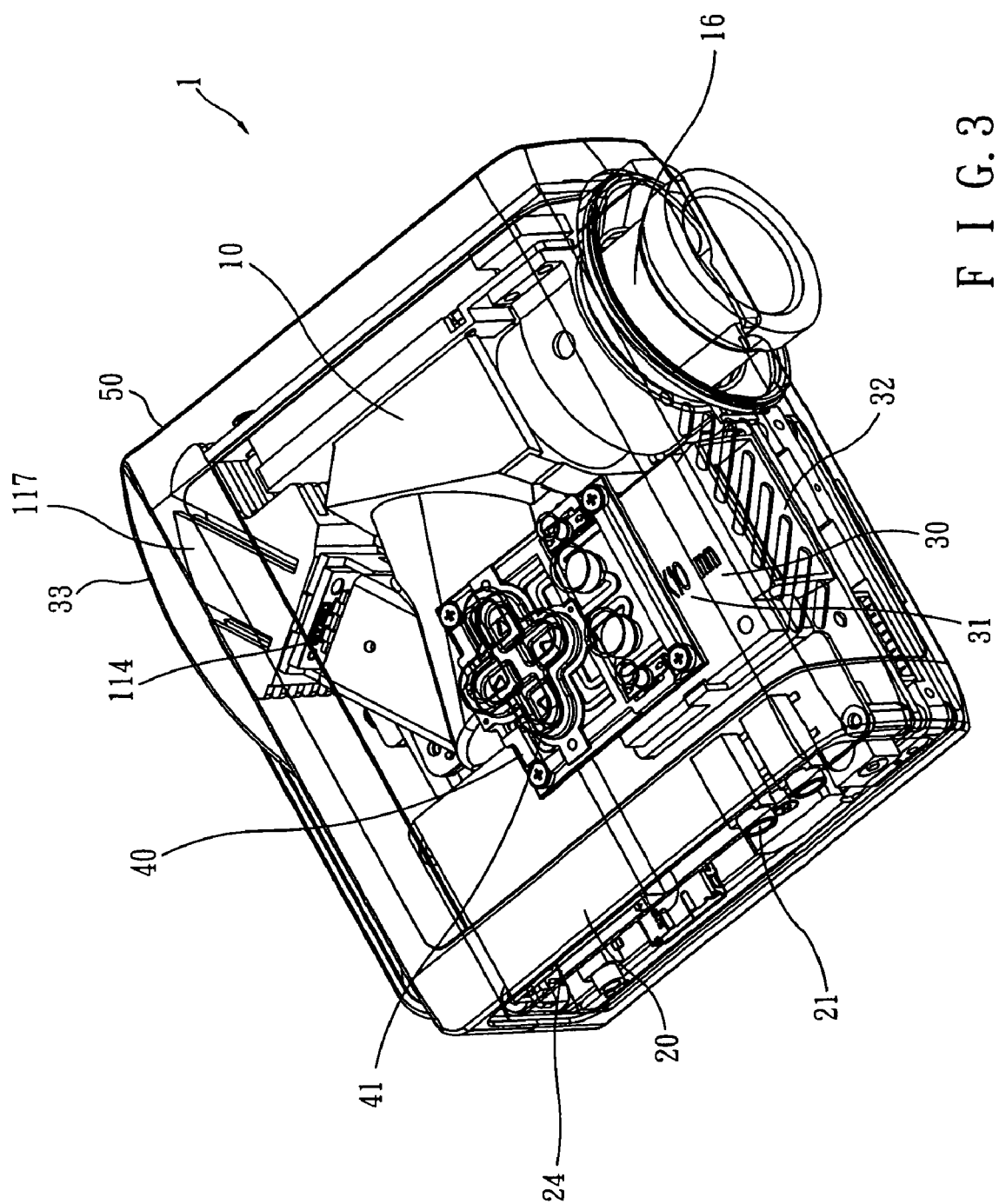
FIG. 3 illustrates a perspective view of such image projector as in FIG. 1 from a different angle.
Figure 4:
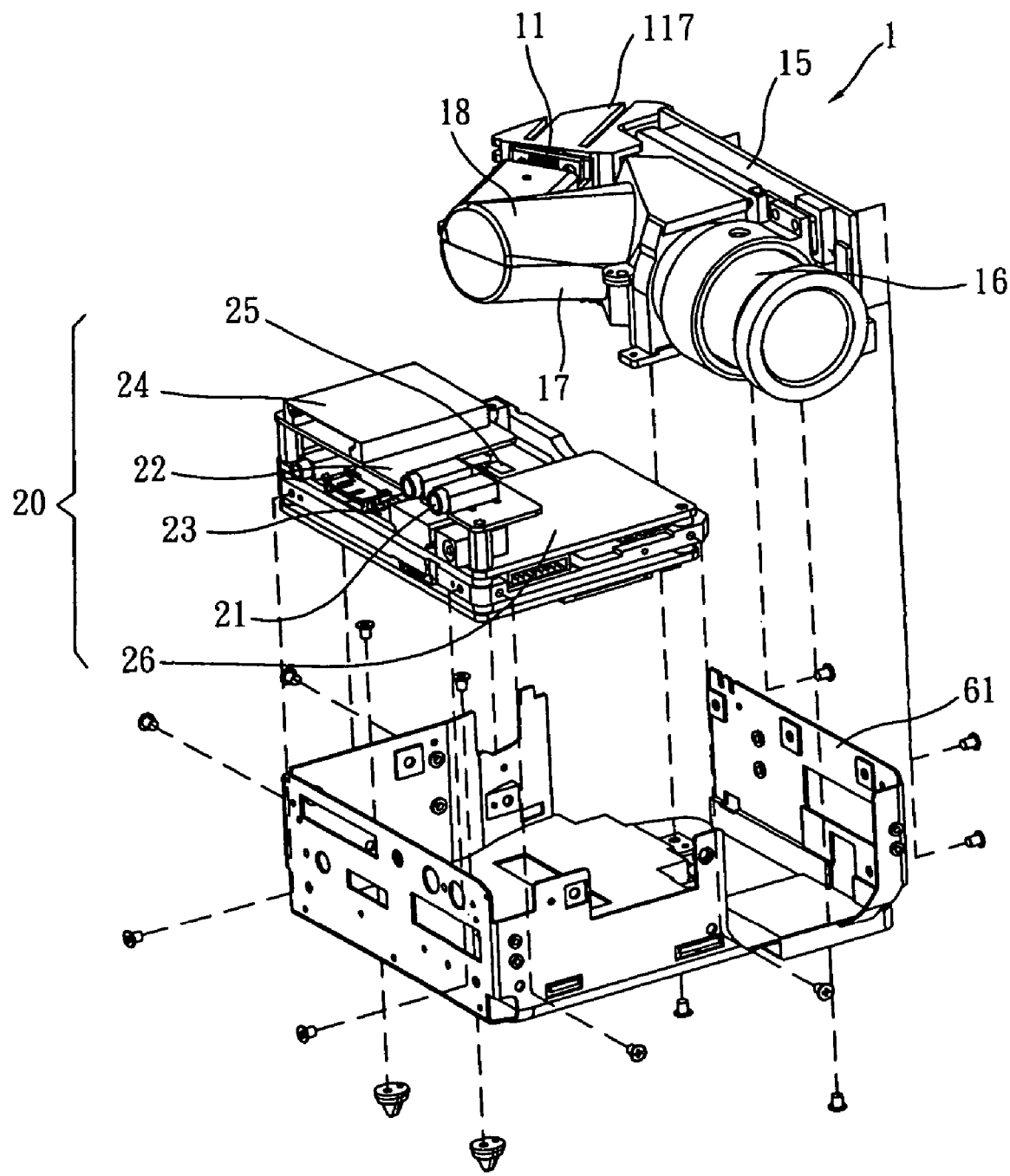
FIG. 4 illustrates a composite drawing of the internal optical engine, PCB module and the lower frame of the main frame of the image projector as shown in FIG. 1.

Please refer to FIG. 1 to FIG. 5. The figures describe a preferred embodiment of the image projector that utilizes a light emitting diode (LED) as its illuminator according to the present invention. FIG. 1 illustrates the frontal stereoscopic view of the exterior appearance of the image projector that utilizes a light emitting diode as illuminator. FIG. 2 illustrates the posterior stereoscopic view of the exterior appearance of the image projector as shown in FIG. 1. FIG. 3 illustrates a perspective view of such image projector as in FIG. 1 from a different angle. FIG. 4 illustrates a composite drawing of the internal optical engine, PCB module and the lower frame of the main frame of the image projector as shown in FIG. 1. FIG. 5 illustrates the composite drawing of the heat sink module, operation interface module and the upper frame of the main frame of the image projector as shown in FIG. 1.

As shown in FIGS. 3, 4 and 5, the image projector 1 of this invention that utilizes a light emitting diode (LED) as illuminator includes: an optical engine 10, a PCB module 20, a heat sink module 30, a operation interface module 40, a main frame and a casing 50.

Figure 8:
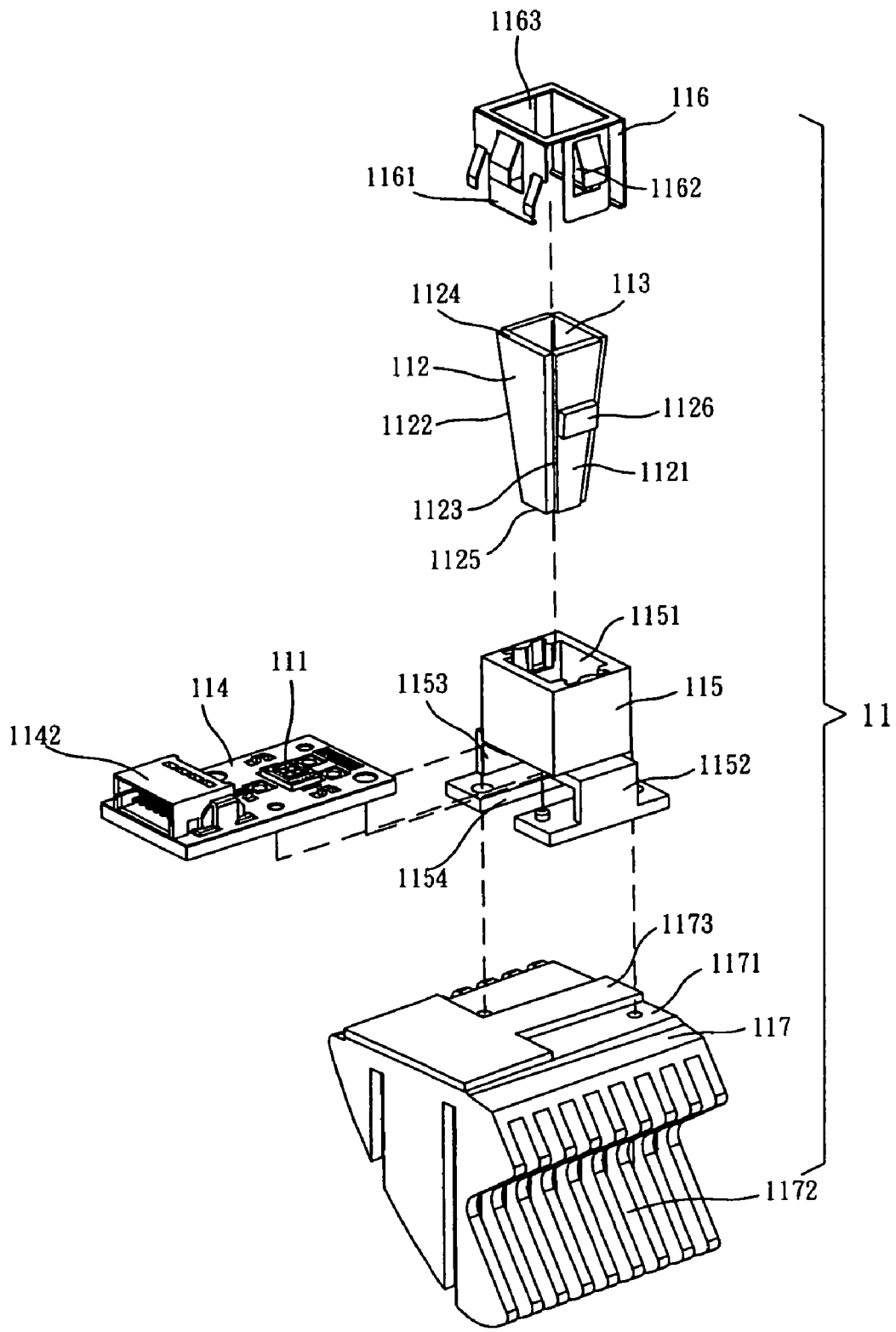
FIG. 8 illustrates the three-dimensional diagram of the illumination module of the image projector according to the present invention.

The optical engine 10 is used for projecting an image. There is a light emitting diode (LED) 111 (as shown in FIG. 8) in the optical engine 10 that produces the light needed for the projection of an image.

The printed circuit board (PCB) module 20 is connected to the optical engine 10 in order to control the projection of the optical engine. The PCB module 20 includes: a first PCB 22 and a second PCB 23 that are set-up in parallel to each other; at least one connecting interface 21 (such as USB interface or AV terminal) for connecting an external device (such as computer or DVD player); at least one card reader 24 (such as flash memorycard reader) for connecting an external memory card (such as CF Card or SmartMedia Card or MMC or SD or MS Card); and a control unit 25 to process the image data received from the connecting interface 21 or card reader 24 and then project the image through the optical engine 10. In a preferred embodiment, the first PCB 22 and the second PCB 23 are horizontally overlaped with each other. The dimension of the first PCB 22 is smaller than the second PCB 23. This provides an area on the second PCB 23 that will not overlap with the first PCB 22. In the design, the card reader 24 is set up on the first PCB 22. The heat-dissipating fan 31 is set up on the supporting plate 26 on the second PCB 23 that does not overlap with the first PCB 22. The control unit 25 is positioned on the second PCB 23 and does not overlap with a heat-dissipating fan 31. The design of this invention, which includes a PCB module 20 including two overlapping PCB 22,23 and the heat dissipating fan 31 being positioned on the area on the second PCB 23 that does not overlap with the first PCB 22, enables a more economical use of space which significantly reduces the dimensions of the image projector 1 of this invention. Also, this design enables higher heat dissipating efficiency due to the reason that the heat-dissipating fan can be placed closer to the heat generating electronic elements such as the microprocessor.

Figure 6:
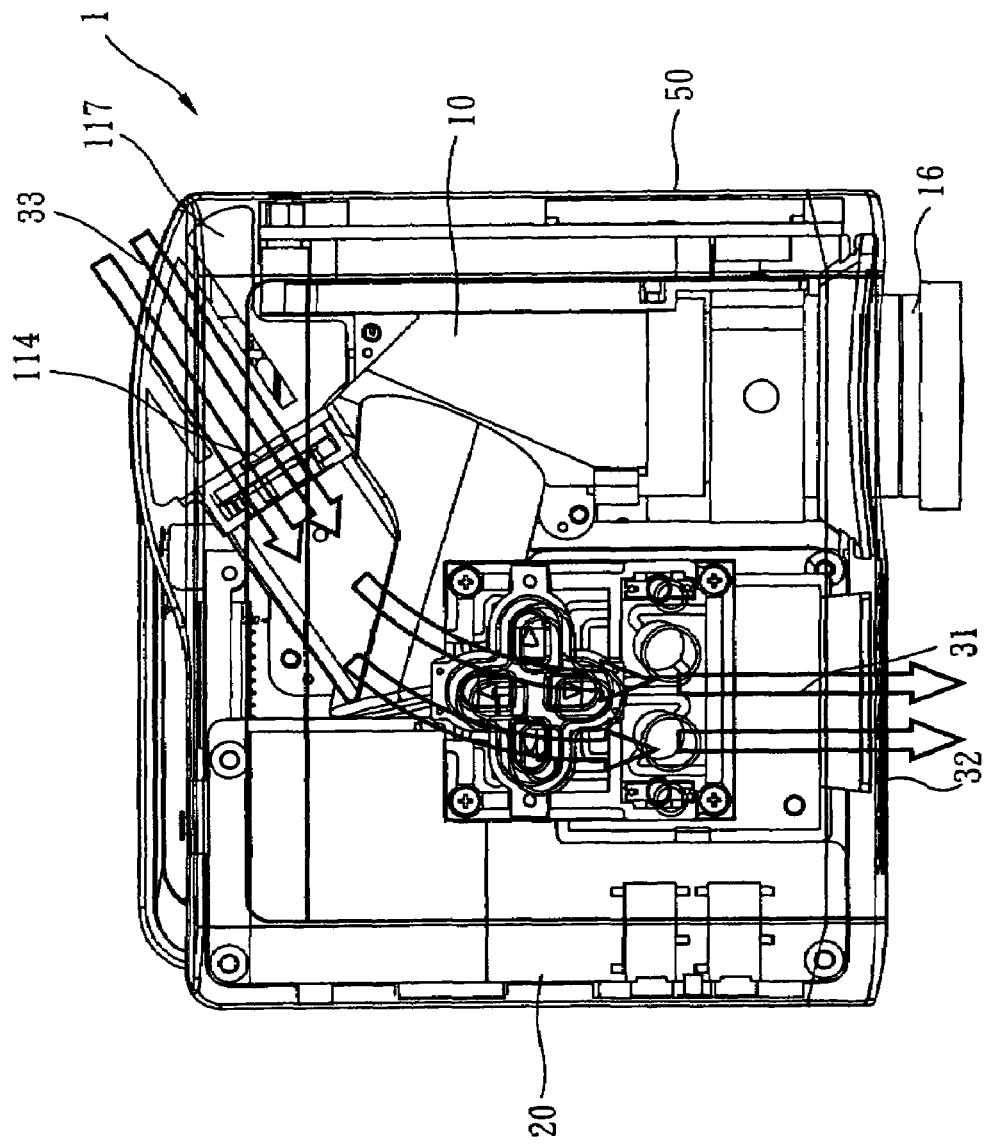
FIG. 6 shows a diagram of the heat-dissipating pathway of the heat flow of the image projector of FIG. 1 according to the present invention.

The heat sink module 30 is used for dissipating the heat generated by the optical engine 10 and the PCB module 20. The heat sink module 30 comprises at least a heat dissipating fan 31, an entrance airway 33 and an exit airway 32, which in fact build into a heat dissipating route that starts from the entrance airway 33 then passes through the heat dissipating fan 31 and then ends at the exit airway 32 (The arrow in FIG. 6 shows the direction of the heat flow in the heat dissipating pathway). Also, the light emitting diode 111 and the control unit 25 are positioned on the heat-dissipating route. In this preferred embodiment, the exit airway 32 of the heat sink module 30 is at one of the front flank of the lower frame 61 of the supporting frame. The heat-dissipating fan 31 is placed at the vicinity of the exit airway 32 and close to the control unit 25. The entrance airway 33 is positioned at the posterior flank of the lower frame 61 of the supporting frame, which is close by the illumination PCB 114 that contains the light emitting diode 111. Therefore, better heat dissipating effect is achieved due to the reason that the light emitting diode 111 receives the cool air that enters through the entrance airway 33, while the control unit 25 dissipates the heat faster by the concentrated airflow that passes through the close-by heat-dissipating fan 31. This designed heat sink module 30 enables the image projector 1 of this invention to eliminate the need of two or more fans or fan with big size of higher power to achieve excellent heat-dissipating effect. It also has the benefit of cutting down the space usage and electricity consumption. Thus, the image projector 1 of this invention needs only one heat-dissipating fan 31 of low power and size together with a heat-dissipating route of less width than usual to achieve efficient heat-dissipating effect, and therefore enables the minimization of the size of the image projector 1.

The operation interface module 40 is connected to the PCB module 20 for the operations of the image projector 1 according to this invention. The operation interface module 40 includes but not limits a power switch of the image projector 1, video signal converter, the adjustment of projection proportion and focus, projection angle or brightness. In a preferred embodiment, the operation interface module 40 includes several keys 41, a keyboard 42 and a keyboard PCB 43. The keyboard PCB 43 is connected to the upper frame 62, while the keyboard 42 and keys 41 are sequentially assembled on the keyboard PCB 43. The abovementioned components are only a preferred embodiment of the invention and not for giving any limitation to the scope of the present invention.

The supporting frame is used to contain and position the optical engine 10, the PCB module 20, the heat sink module 30 and the operation interface module 40, which were described previously. In this preferred embodiment, the supporting frame includes a lower frame 61 and an upper frame 62. There are several screw holes and sockets at the predetermined area of the lower frame 61 and upper frame 62 so that the optical engine 10, the PCB module 20, the heat sink module 30 and the operation interface module 40 can be screwed on to the predetermined area and the elements such as connection interface 21 and keys 41 can be exposed external of the casing 50. Through this assembly, the upper and lower frames 62,61 of the supporting frame can integrate the optical engine 10, PCB module 20, heat sink module 30 and operation interface module 40 into the image projector 1. Thus, the designer of the image projector 1 of this invention only needs to overlay different designs for the casing 50 on only one unit of the supporting frame that includes all the elements for the image projector 1, for the diversification of the product. The designer does not have to design different supporting frame for each of the different outer casing. This invention provides for the effect of design-modularization.

Figure 7:
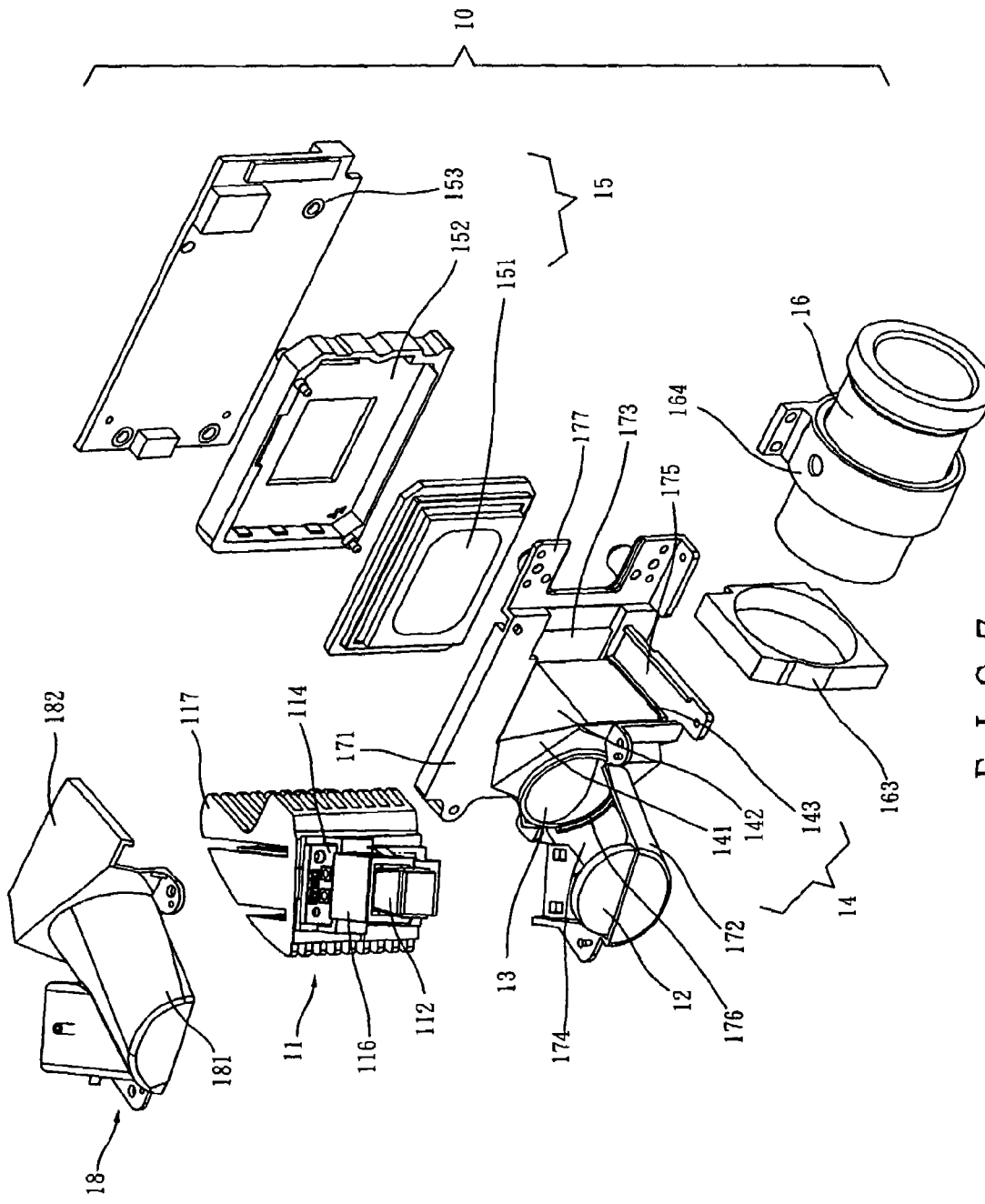
FIG. 7 illustrates the three-dimensional diagram of the optical engine of the image projector according to the present invention.

Please refer to FIG. 7 and FIG. 8. These figures illustrate the preferred embodiments of the optical engine 10 of the image projector 1 according to this invention. FIG. 7 illuminates the three-dimensional diagram of the optical engine 10 of the image projector 1 of this invention. FIG. 8 shows the three-dimensional diagram of the illumination module 11 of the image projector 1 of this invention.

As shown in FIG. 7 and FIG. 8, the optical engine 10 of this invention includes: an illuminator module 11, a concave mirror 12, a condenser 13, a prism module 14, a Digital Micromirror Device (DMD) 15 and a projection lens set 16 put together by several lenses 161 and an aperture 162. The formation of the image at an external surface is by the following process: firstly, the dispersed rays of the light emitted by the light-emitting diode 111 of the illumination module 11 is concentrated by the pyramidal pole 112 of the illumination module 11. A concave mirror 12 then collects and refracts the concentrated rays to the converging lens 13, which collects the rays and pass it towards the prism module 14 that refracts the rays towards the DMD 15. The DMD 15 reflexes the rays and produces images that is again refracted by the prism module 14 towards the projection lens set 16, focuses the image and then forms image at the external projection surface.

To precisely orient all the elements described previously, the optical engine 10 of this invention has a special orientation mechanism. As shown in FIG. 7, the optical engine further includes a base 17 and an upper lid 18. In this embodiment, it is better to produce the base 17 and the upper lid 18 by plastic injection molding. On the base 17, a right cover 171 and a lower lid 172 are also included. The right cover 171 forms a first space 173 to contain the DMD 15. The lower lid 172 on the other hand, forms a v-shape lower concave base 174, which adjoins with a below-prism shading piece 175 at the right cover 171. It also forms a below-concave groove 176 in between the v-shape lower concave base 174 and the below-prism shading piece 175. The upper lid 18 can be connected to the lower lid 172 on the base 17. Moreover, there is a v-shape upper concave base 181, an above-prism shading piece 182 and an above concave groove (not shown in the FIG.) on the upper lid 18. The position of the upper concave base 181, the above-prism shading piece 182 and the above concave groove each respectively corresponds to the v-shape lower concave base 174, the below-prism shading piece 175 and the below-concave groove 176. When the upper lid 18 shuts with the lower lid 172, a containing space is formed between the two lids. When assembling the optical engine 10 of this invention, the prism module 14 is contained between the above-prism shading piece 182 and the below-prism shading piece 175. The converging lens 13 is contained between the above-concave groove and the below-concave groove 176. The concave mirror 12 is contained between the v-shape upper concave base 181 and the bended area of the v-shape lower concave base 174. Also, the pyramidal pole 112, the fixing stand 115 and the spring clip 116 are contained between the v-shape upper concave base 181 and the end of the v-shape lower concave base 174. In addition, under the lower surface of the prism module 14, there is a prism supporting board 143 and a spring 144 that is used for orienting and micro-adjusting the relative position of the prism module 14. As a result, using the specially designed structure of the base 17 and the upper lid 18, one can rapidly, easily and precisely assemble each element at its predetermined angle, relative position and distance.

The DMD 15 further includes: a DMD chip 151, a DMD socket 152 for the DMD chip 151 to plug in, a DMD PCB 153 to connect to the DMD socket 152, and a DMD power connector 154 to connect to the DMD PCB 153. When DMD 15 is assembled to the right lid 171 of the base 17, the DMD chip 151 would be exposed at a window located at the center of the first space 173. This enables the DMD chip to receive light from the prism module 14. The projection lens set 16 is located at an opening in between the above-prism shading piece 182 and the below-prism shading piece 175. The projection lens set 16 also includes a rubber 163 and a fastening ring 164. The rubber 163 can be put around the exterior of the projection lens set 16, and the contour of the rubber 163 can seal the space between the above-prism shading piece 182 and the below-prism shading piece 175 to prevent disturbance due to light leakage. The fastening ring 164 locks the projection lens set 16 on the extension frame 177 of the right lid 171.

In this preferred embodiment, the prism module 14 is of the reversed total internal reflection (RTIR) design. It includes: a first prism 141, a second prism 142 and a prism supporting board 143. The first prism 141 is placed closer to converging lens 13 while the second prism is placed closer to the DMD 15. Both first and second prisms 141,142 are made from transparent material that has a predetermined reflective index. The first prism 141 is a wedge prism. The cross section in which the direction of the light beam passes is conical in shape. The second prism 142 is a right angle prism. The cross section in which the direction of the light beam passes is a right triangle. Also the first prism 141 is attached to hypotenuse surface of the right triangle of the cross section of the second prism 142. The DMD 15 and the projection lens 16 are respectively placed on the two perpendicular surfaces of the right triangle of the cross section of the second prism 142.

As shown in FIG. 8, the illuminator module 11 includes: a light emitting diode 111, a pyramidal pole 112, a light reflective measure, a PCB 114, a fixing stand 115 and a spring clip 116. A heat-dissipating element 117 is combined to the illuminator module to enhance heat-dissipation.

The light emitting diode 111 is used for emitting light at a predetermined beam axis. In this invention, one end of the pyramidal pole 112 is closer to the light emitting diode 111. The pyramidal pole 112 has several numbers of narrow and long surfaces 1121 that extends in the direction of the beam axis. In this preferred embodiment, the cross section of the pyramidal pole 112 that is perpendicular to the beam axis has a square contour. Each narrow and long surfaces 1121 respectively has two opposite long edges that follows the direction of the beam axis 1122, 1123 and two opposite short edges that is perpendicular to the beam axis 1124,1125. Also, the short edge 1125 on the narrow and long surface 1121 closer to the light emitting diode 111 is shorter compared to the short edge 1124 that is further away from the light emitting diode 111. In this case, the cross section of the pyramidal pole 112 in essence, increases in size as furthering away from the light emitting diode 111. The concave mirror 12 is located at the end of biggest cross section of the pyramidal pole 112.

This reflective measure that was utilized in each narrow and long surfaces 1121 of the pyramidal pole let the narrow and long surfaces 1121 reflex the light beam emitted by the light emitting diode 111, which guides the light beam to move along the beam axis. In the preferred embodiment in FIG. 8, the pyramidal pole 112 is a hollow conical structure that is better made of transparent materials. However, glass, plastic crystals and quartz can also be used. The reflective measure is such that the inner surface of each narrow and long surfaces 1121 of the hollow pyramidal pole 112 are coated with reflective material (such as silver, etc), which enables the total reflex of the light in the hollow pyramidal pole 112 and passing of the light beam from the smaller cross section towards the larger cross section of the pyramidal pole 112. In this case, the pyramidal pole 112 in this invention could achieve the purpose of generally directing the light beam to move along the beam axis.

The PCB 114 is used to support the light emitting diode 111. There are also several electronic elements (not numbered) to drive the light emitting diode 111 and a connector 1142. The fixing stand 115 is connected to the PCB 114. On the fixing stand 115, there is an approximately square shape hollow sink 1151 in which the smaller cross section end of the pyramidal pole 112 can fit in. Also, the position of the light emitting diode 111 respectively fits in with the smaller cross section end of the pyramidal pole 112. Moreover, the fixing stand 115 has two stands 1152,1153 and a sliding route 1154 positioned between the two stands. The dimensions of the sliding route 1154 matches the dimensions of the PCB 114, so that the PCB 114 can slide into the sliding route 1154 to connect with the fixing stand 115.

The spring clip 116 clips and secures the pyramidal pole 112 on the fixing stand 115. In this preferred embodiment, the spring clip 116 further includes several clips 1161, at least one buttoning clip 1162 on one of the clips 1161, and holes 1163 located in between each clips 1161. The dimensions of the holes are bigger than that of the largest cross section of the pyramidal pole 112. When the holes 1163 of the spring clip 116 slip onto the pyramidal pole 112, and at least one of the clips 1161 clips on to the edge of the fixing stand 115, the pyramidal pole 112 can be connected and fixed on the fixing stand 115. In this preferred embodiment, a bump 1126 can be set up on at least one narrow and long surface 1121 of the pyramidal pole 112, so that when the hole 1163 of the spring clip 116 slips onto the pyramidal pole 112, the bump 1126 can exactly sustain the spring clip 116 and the fixing stand 115 to prevent shifting.

The heat-dissipating element 117 contains a heat dissipating contact surface 1171 and multiple heat-dissipating fins 1172 that extended from the heat dissipating contact surface 1171. On the heat dissipating contact surface 1171 there is also a convex surface 1173 of predetermined shape. The fixing stand 115 and the PCB 114 make connections on the heat dissipating contact surface 1171, and the bump 1173 is exactly located at the space formed by the two stands 1152,1153. This enables the location on the PCB 114 that supports the light emitting diode 111 to directly contact the bump 1173 on the heat dissipating contact surface 1171.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. An image projector having a light emitting diode (LED) light source, the image projector comprising:
    an optical engine for projecting an image, the optical engine having a LED for producing the light needed for the projection of the image;
    a printed circuit board (PCB) module coupled to the optical engine to control the projection of the optical engine, the PCB module comprising:
    a first PCB;
    a second PCB which is set-up in parallel to the first PCB;
    at least one connecting interface for connecting an exterior device; and
    a control unit, coupled to the at least one connecting interface, for processing image data received from the at least one connecting interface and transferring the processed image data to the optical engine;
    a heat sink module for dissipating the heat generated by the optical engine and the PCB module, the heat sink module comprising a heat dissipating fan, an entrance airway, and an exit airway, which build into a heat dissipating route that starts from the entrance airway then passes through the heat dissipating fan and then ends at the exit airway, and the LED and the control unit are positioned on the heat-dissipating route;
    a operation interface module, coupled to the PCB module, for controlling the operation of the image projector; and
    a supporting frame utilized to contain and position the optical engine, PCB module, heat-dissipating module and operation interface module;
    wherein the first PCB and the second PCB horizontally overlaps each other, the size of the first PCB is smaller than that of the second PCB, the heat dissipating fan is located on the area on the second PCB that does not overlap with the first PCB.

2. The image projector according to claim 1, wherein the PCB module further comprises at least one memory-card connecting module for connecting an external memory card, wherein the control unit processes image data from the external memory card and transfers the processed image data to the optical engine, the at least one memory-card connecting module is located at the first PCB.

3. The image projector according to claim 1, wherein the control unit is located on the area of the second PCB and does not overlap with the heat-dissipating fan.

4. The image projector according to claim 1, wherein the supporting frame includes a lower frame and an upper frame, and there are several screw holes and sockets at the predetermined position of the lower frame and upper frame so that optical engine, the PCB module, the heat sink module, and the operation interface module be screwed on to the predetermined position.

5. The image projector according to claim 4, wherein the exit airway of the heat sink module is at one of the front flank of the lower frame of the supporting frame, wherein the heat-dissipating fan is placed at the vicinity of the exterior airway and close to the control unit, wherein the entrance airway is positioned at the posterior flank of the lower frame of the supporting frame such that better heat dissipating effect is achieved due to the reason that the LED receives the cool air that enters through the entrance airway, while the control unit dissipates the heat faster by the concentrated airflow that passes through the close-by heat-dissipating fan.

6. The image projector according to claim 4, wherein the operation interface module further comprises a plurality of keys, a keyboard, and a keyboard PCB which is connected to the upper frame, wherein the keyboard and the keys are sequentially assembled on the keyboard PCB.

7. The image projector according to claim 1, wherein the optical engine comprises:
    a Digital Micromirror Device (DMD) for receiving the light from the optical engine, and refracting the image;
    a projection lens set for focusing the image and forming on an external projection surface;
    a pyramidal pole having one end being closer to the LED, and a plurality of narrow and long surfaces that extends in the direction of the beam axis, wherein the cross section of the pyramidal pole that is perpendicular to the beam axis has a square contour, and the cross section of the pyramidal pole increases in size as furthering away from the LED; and
    a reflecting piece which is implemented to the narrow and long surfaces to reflect the light from the LED and guides it toward the direction of the light axis.

8. The image projector according to claim 7, wherein the pyramidal pole is a hollow cone made of transparent material, and the light reflecting pieces is the interior surfaces of the narrow and long surfaces.

9. The image projector according to claim 7, wherein the optical engine comprises:
    a light source printed circuit board (PCB) for supporting the LED;
    a fixing stand, connected to the light source PCB, having a hollow sink, wherein the hollow sink is used for installing the end with the smaller cross-sectional area of the pyramidal pole and the location of the LED corresponds exactly to the end with the smaller cross-sectional area of the pyramidal pole; and a spring clip for clipping the pyramidal pole to the fixing stand.

10. The image projector according to claim 9, wherein the fixing stand comprises a first stand, a second stand and a sliding route which is between the first stand and the second stand, wherein the size of the sliding route matches exactly with the size of the light source PCB so that the light source PCB slides into the sliding route to attach with the fixing stand, wherein the optical engine further comprises:
 a heat sink module comprising a heat dissipating surface and a plurality of heat dissipating fins extended from the heat dissipating surface, the heat dissipating surface comprising a convex surface with predetermined shape, wherein the fixing stand and the light source PCB are connected to the heat dissipating surface, and the location of the convex surface forms exactly a space with the first and the second stands so that the light source on the light source PCB is contacted to the convex surface of the heat dissipating surface.

11. The image projector according to claim 9, wherein the spring clip comprises a plurality of clips, at least one buttoning clip on one of the clips and a plurality of holes corresponding to the clips, the size of the hole is greater than the larger cross-sectional area end of the pyramidal pole, the pyramidal pole is fixed to the fixing stand with the hole of the spring clip encases upon the pyramidal pole and with the help of at least a clip to clip onto the edge of fixing stand; wherein a bump is set up on at least one narrow and long surface of the pyramidal pole, so that when the hole of the spring clip slips onto the pyramidal pole, the bump exactly sustains the spring clip and the fixing stand to prevent shifting.

12. The image projector according to claim 9, wherein the optical engine further comprises:
 a concave mirror, which is located at the end of the cross-sectional area of the pyramidal pole, for refracting and converging the light which is guided toward the direction of a light axis;
 a light condenser for receiving and converging the light from the concave mirror; and
 a reversed total internal reflection (RTIR) for receiving and refracting the light from the light condenser, the reversed total internal reflection (RTIR) comprising:
  a first prism which is located near the light condenser; and
  a second prism, which is located near the Digital Micromirror Device (DMD) and the projection lens set;
  wherein the first prism is a wedge prism which presents itself in on the cross-sectional surface of the light as a pyramidal shape, the second prism presents itself on the cross-sectional surface of the traveling light as a right triangle, the first prism leans against the surface drawn from an edge of the right triangle along the cross-sectional surface formed by the second prism.

13. The image projector according to claim 12, wherein the optical engine further comprises:
 a base comprising:
  a right cover for forming a first space to contain the Digital Micromirror Device (DMD); and
  a lower lid for forming a v-shaped lower concave base and a below-prism shading piece connected in adjacent to the right cover, wherein a lower concave groove is located between the v-shaped lower concave base and the below-prism shading piece; and
  a upper lid for connecting the lower lid of base, the upper lid comprising a v-shaped upper concave base, an above-prism shading piece and an upper groove whose locations correspond to the v-shaped lower concave base, the below-prism shading piece and a lower concave groove, respectively, wherein a space is formed when the upper lid covers up with lower lid;
 wherein the reversed total internal reflection (RTIR) is located in between the above-prism shading piece and the below-prism shading piece, the light condenser is located in between the upper concave groove and the lower concave groove, the concave mirror is located in the corner formed by the v-shaped upper concave base and the v-shaped lower concave base;
 wherein the end of the v-shaped upper concave base and the v-shaped lower concave base contain the pyramidal pole and the fixing stand.

14. An image projector having a light emitting diode (LED) light source, comprising:
 an optical engine comprising:
 a light emitting diode (LED) for producing the light;
 a Digital Micromirror Device (DMD) for receiving the light from the optical engine, and refracting the image; and
 a projection lens set, for focusing the image and forming on an external projection surface;
 a printed circuit board (PCB) module connected to the optical engine to control the projection of the optical engine, the PCB module comprising:
  a first PCB;
  a second PCB which is set-up in parallel to the first PCB;
  at least one connecting interface for connecting an exterior device; and
  a control unit, coupled to the at least one connecting interface, for processing image data received from the at least one connecting interface and transferring the processed image data to the optical engine;
 a heat sink module for dissipating the heat generated by the optical engine and the PCB module, the heat sink module comprising a heat dissipating fan, an entrance airway, and an exit airway, which build into a heat dissipating route that starts from the entrance airway then passes through the heat dissipating fan and then ends at the exit airway;
 a operation interface module, coupled to the PCB module, for controlling the operation of the image projector; and
 a supporting frame utilized to contain and position the optical engine, PCB module, heat-dissipating module and operation interface module;
 wherein the first PCB and the second PCB horizontally overlaps each other, the size of the first PCB is smaller than that of the second PCB, the heat dissipating fan is located on the area on the second PCB that does not overlap with the first PCB.

15. The image projector according to claim 14, wherein the control unit is located on the area of the second PCB and does not overlap with the heat-dissipating fan.

16. The image projector according to claim 14, wherein the exit airway of the heat sink module is at one of the front flank of the lower frame of the supporting frame, wherein the heat-dissipating fan is placed at the vicinity of the exterior airway and close to the control unit, wherein the entrance airway is positioned at the posterior flank of the lower frame of the supporting frame such that better heat dissipating effect is achieved due to the reason that the LED receives the cool air that enters through the entrance airway, while the control unit dissipates the heat faster by the concentrated airflow that passes through the close-by heat-dissipating fan.

17. An image projector having a light emitting diode (LED) light source, the image projector comprising:
- an optical engine for projecting an image;
- a printed circuit board (PCB) module, coupled to the optical engine, for controlling an operation of the optical engine;
- a heat sink module, coupled to the optical engine and the PCB module, for dissipating a heat generated by the optical engine and the PCB module;
- a operation interface module, coupled to the PCB module, for controlling an operation of the image projector; and
- a supporting frame utilized to contain and position the optical engine, PCB module, heat-dissipating module and operation interface module;
- wherein the PCB module comprises:
  - a first PCB;
  - a second PCB which is set-up in parallel to the first PCB;
  - at least one connecting interface for connecting an exterior device; and
  - a control unit, coupled to the at least one connecting interface, for processing image data received from the at least one connecting interface and transferring the processed image data to the optical engine;
- wherein the heat sink module comprises a heat dissipating fan, an entrance airway, and an exit airway, which build into a heat dissipating route that starts from the entrance airway then passes through the heat dissipating fan and then ends at the exit airway;
- wherein the first PCB and the second PCB horizontally overlaps each other, the size of the first PCB is smaller than that of the second PCB, the heat dissipating fan is located on the area on the second PCB that does not overlap with the first PCB.

18. The image projector according to claim 17, wherein the control unit is located on the area of the second PCB and does not overlap with the heat-dissipating fan.

19. The image projector according to claim 17, wherein the heat-dissipating fan is placed at the vicinity of the exterior airway and close to the control unit, wherein the entrance airway is positioned at the posterior flank of the lower frame of the supporting frame such that better heat dissipating effect is achieved due to the reason that the LED receives the cool air that enters through the entrance airway, while the control unit dissipates the heat faster by the concentrated airflow that passes through the close-by heat-dissipating fan.

* * * * *